US005556720A

United States Patent [19]

Charkey

[11] Patent Number: 5,556,720

[45] Date of Patent: Sep. 17, 1996

[54] SEALED ZINC SECONDARY BATTERY AND ZINC ELECTRODE THEREFOR

[75] Inventor: Allen Charkey, Brookfield, Conn.

[73] Assignee: Energy Research Corporation, Danbury, Conn.

[21] Appl. No.: 431,556

[22] Filed: May 1, 1995

Related U.S. Application Data

[63] Continuation-in-part of Ser. No. 292,614, Aug. 18, 1994, Pat. No. 5,460,899.

[51] Int. Cl.[6] .......... H01M 4/48; H01M 10/24

[52] U.S. Cl. .......... 429/59; 429/136; 429/206; 429/223; 429/224; 429/229

[58] Field of Search .......... 429/229, 223, 429/224, 222, 59, 57, 206, 231, 136; 252/182.1

[56] References Cited

U.S. PATENT DOCUMENTS

| | | | |
|---|---|---|---|
| 1,316,760 | 9/1919 | Benner et al. . | |
| 3,516,862 | 6/1970 | van der Grinten | 136/30 |
| 3,816,178 | 6/1974 | Maki et al. | 136/30 |
| 3,870,564 | 3/1975 | Takamura et al. | 136/30 |
| 4,041,221 | 8/1977 | Berchielli et al. | 429/206 |
| 4,084,047 | 4/1978 | Himy et al. | 429/206 |
| 4,091,193 | 5/1978 | Horowitz et al. | 429/219 |
| 4,279,978 | 7/1981 | Dodin et al. | 429/248 |
| 4,292,357 | 9/1981 | Erisman et al. | 428/124 |
| 4,327,223 | 4/1982 | Himy et al. | 429/229 X |
| 4,418,130 | 11/1983 | Soltis et al. | 429/206 |
| 4,735,876 | 4/1988 | Miura et al. | 429/206 |
| 5,045,170 | 9/1991 | Bullock et al. | 204/280 |

FOREIGN PATENT DOCUMENTS 2180940 11/1973 France .

OTHER PUBLICATIONS

Patent Abstracts of Japan, JP–A–58 137963, vol. 007, No. 251, Aug. 16, 1983.

Journal of the Electrochemical Society, Oct. 1986, USA, vol. 133, No. 10, pp. 1989–1995, E. G. Gagnon "Effects of KOH Concentration on the Shape Change and Cycle Life of Zn/NiOOH Cells".

*Primary Examiner*—Anthony Skapars
*Attorney, Agent, or Firm*—Robin, Blecker, Daley & Driscoll

[57] ABSTRACT

A zinc negative electrode comprising a zinc active material, $Ba(OH)_2$ or $Sr(OH)_2$ and a conductive matrix including a metallic oxide which is more electropositive than zinc. The zinc negative electrode is incorporated into a zinc secondary battery having an electrolyte whose electrolyte constituent is a low percentage of the electrolyte. The zinc negative electrode is split into electrode assemblies separated by a porous hydrophobic element.

28 Claims, 2 Drawing Sheets

SEALED ZINC SECONDARY BATTERY AND ZINC ELECTRODE THEREFOR

RELATED APPLICATIONS

This application is a continuation-in-part of U.S. application Ser. No. 08/292,614, filed Aug. 18, 1994, now U.S. Pat. No. 5,460,899.

BACKGROUND OF THE INVENTION

This invention relates to rechargeable or secondary batteries and, in particular, to rechargeable or secondary batteries using zinc negative electrodes.

Various types of zinc secondary batteries are known in the art. Typical batteries are Ni—Zn, Ag—Zn, Zn—$O_2$ and $MnO_2$—Zn.

Zinc secondary batteries employ zinc negative electrodes which exhibit a decay or reduction in capacity with the repetitive charge-discharge cycling of the battery. As a zinc secondary battery and, therefore, each of its zinc negative electrodes, is cycled, the zinc active material of each electrode becomes redistributed over the surface of the electrode. This redistribution of active material or so-called "shape change" of each zinc electrode is a result of the solubility of the zinc active material in the alkaline electrolyte of the battery and causes a reduction in the capacity of the battery.

The solubility of the zinc active material in the battery electrolyte also causes an increase in the battery gas pressure due to the decreased availability of the zinc active material to recombine with oxygen generated during charging. It similarly leads to an increase in the rate of hydrogen evolution by the battery. Accordingly, a rapid buildup of gas pressure occurs in the battery, often requiring that the battery be vented. Constant venting of the battery, however, causes loss of water through electrolysis. This, in turn, causes dryout of the battery electrodes, reducing battery life.

Over the years, many different zinc negative electrodes have been proposed to reduce electrode shape change. One such zinc negative electrode is disclosed in U.S. Pat. No. 3,516,862 issued to W. Van der Grinten. In the '862 Patent, $Ca(OH)_2$ is added to the zinc active material (ZnO) to reduce the solubility of the active material through the formation of $CaZn_2(OH)_6$ (calcium zincate). In U.S. Pat. No. 3,816,178, Maki, et al. disclose a zinc electrode containing $Ca(OH)_2$ along with addition of oxides of lead. In U.S. Pat. No. 4,418,130, Soltis, et al. disclose the use of $Ba(OH)_2$octahydrate. However, in these electrodes, the formed calcium or barium zincates experience thermodynamic instability due to dissociation in the battery electrolyte and a finite solubility as evidenced by improved but still low cycle life.

Also in the above-mentioned '614 application a zinc negative electrode is disclosed comprised of a zinc active material, a $Ca(OH)_2$material and a conductive matrix containing a metal oxide material which is more electropositive than the zinc active material. The zinc electrode is utilized with an electrolyte having a low concentration of electrolyte constituent and the electrode, electrolyte and a positive electrode are arranged in a container to form a zinc secondary battery.

The $Ca(OH)_2$material of the zinc negative electrode of the '614 application is in the range of 15–40 percent of the weight of the electrode and the metallic oxide material is in the range of 5–20 percent of the weight of the electrode.

Also, the electrolyte contains an electrolyte constituent which is in the range of 5–20 percent of the electrolyte.

Also disclosed in the '614 application, in order to promote gas recombination, the zinc negative electrode is further configured as a split electrode with adjacent like electrode assemblies spaced by a porous hydrophobic element. Each electrode assembly includes an active element comprised of zinc active material, $Ca(OH)_2$and a conductive matrix formed with a metallic oxide. One side of the active element abuts a metallic current collector element which, in turn, abuts a gas recombination catalytic element formed from a material more electropositive than zinc and having a chemical or electrochemical affinity for reacting with oxygen. The gas recombination catalytic elements of the electrode assemblies abut the hydrophobic element. The latter element and the electrode assemblies are enveloped by a separator material to complete the electrode.

While the zinc negative electrode of the '614 application provides improved stability, insolubility and gas recombination, there is still a need to provide the zinc negative electrode with added resistance to solubility.

It is, therefore, an object of the present invention to provide an improved zinc negative electrode and zinc secondary battery.

It is a further object of the present invention to provide a zinc negative electrode and zinc secondary battery with reduced shape change and solubility of the zinc electrode.

It is yet a further object of the present invention to provide a zinc negative electrode and zinc secondary battery meeting the above objectives and having improved gas recombination, permitting the battery to be sealed and maintenance free.

SUMMARY OF THE INVENTION

In accordance with the principles of the present invention, the above and other objectives have been realized utilizing a zinc negative electrode as described in the '614 application modified to provide increased insolubility. More particularly, it has been recognized that improved insolubility of the zinc negative electrode of the '614 application can be realized by utilizing a $Ba(OH)_2$or $Sr(OH)_2$material in place of $Ca(OH)_2$ material used in the '614 application electrode. Otherwise, the zinc negative electrode of the present invention is substantially as described in the '614 application.

BRIEF DESCRIPTION OF THE DRAWINGS

The above and other features and aspects of the present invention will become more apparent upon reading the following detailed description in conjunction with the accompanying drawings in which.

DETAILED DESCRIPTION

Figures 1, 2:
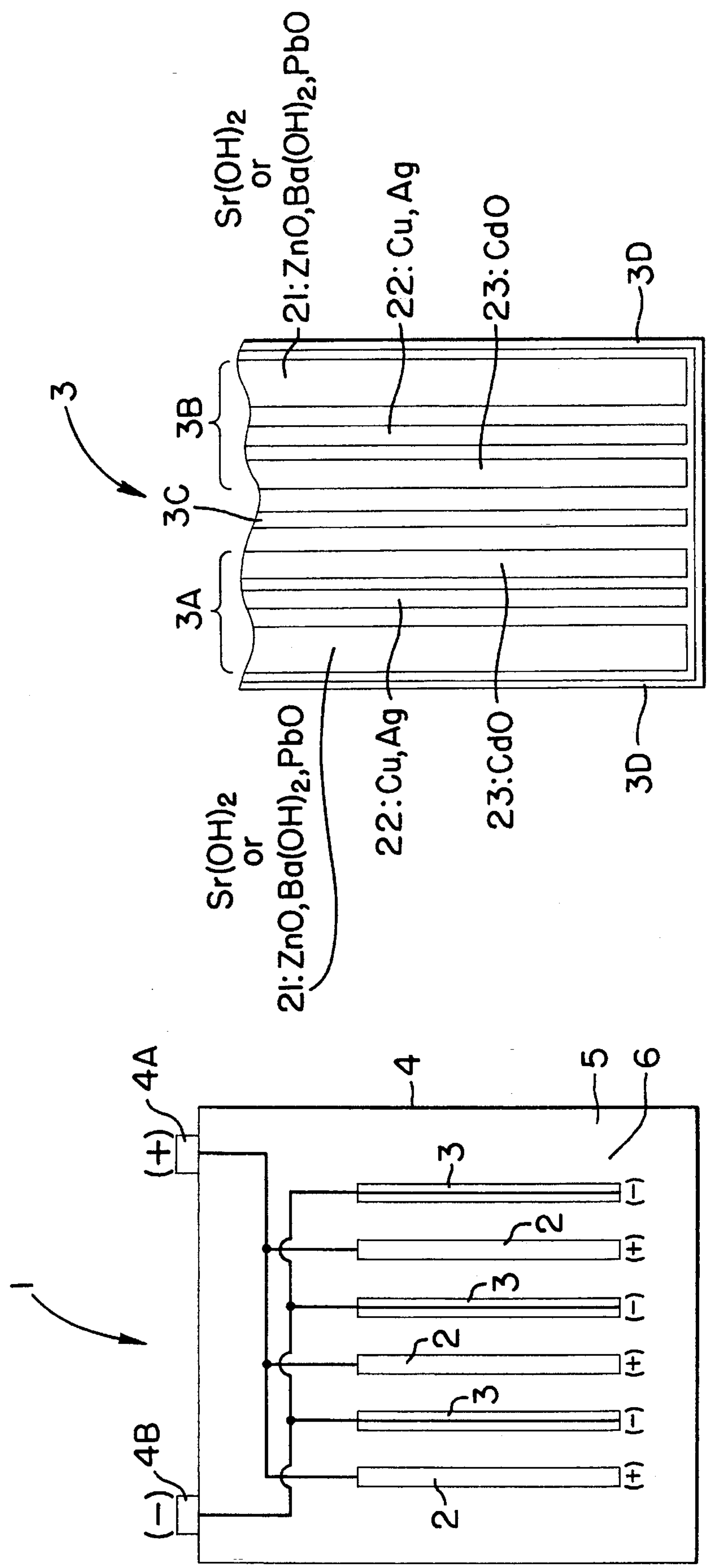
FIG. 1 shows a zinc secondary battery employing a zinc negative electrode in accordance with the principles of the present invention.
FIG. 2 shows the zinc negative electrode of the battery of FIG. 1 in greater detail.

FIG. 1 shows a sealed zinc secondary battery 1 in accordance with the principles of the present invention. As shown, the battery 1 comprises a plurality of positive electrodes 2 and a plurality of zinc negative electrodes 3 configured in accordance with the principles of the present invention. The positive electrodes 2 and negative electrodes 3 are interleaved with each other and the interleaved arrangement of electrodes is disposed in a sealed container 4 having positive and negative terminals 4A and 4B. The container 4 also holds an electrolyte 5 having an electrolyte constituent 6.

In accordance with the principles of the present invention, each zinc negative electrode 3 comprises a zinc active material, a $Sr(OH)_2$or $Ba(OH)_2$material and a metallic matrix formed from a metallic oxide more electropositive than zinc. A useable zinc active material is ZnO. Useable metallic oxide materials are PbO, $Bi_2O_3$, CdO, $Ga_2O_3$ and $Ti_2O_3$, with the first three being preferable. The aforesaid metallic oxides are more electropositive than zinc and are easily reduced to metal during charging without lowering the hydrogen overpotential of the respective electrode 3.

Also, in accord with the invention, the concentration of electrolyte constituent 6 in the electrolyte 5 is maintained relatively low and within a range of 5–20 percent of the weight of the electrolyte. A useable electrolyte constituent is KOH of this weight concentration. Moreover, in yet further accord with the invention, the percentage of $Sr(OH)_2$ or $Ba(OH)_2$ in each negative electrode 3 is in the range of 15–40 percent of the weight of the electrode and the percentage of metallic oxide in each electrode 3 is in the range of 5–20 percent of the weight of the electrode. The latter range of the metallic oxide insures that a uniformly dispersed conductive matrix is present in the electrode.

With this construction of the zinc negative electrodes 3 and the battery 1, it has been found that the production of zinc dendrites during charging and, therefore, the resultant shape change of the electrodes 3 is greatly reduced. At the same time, the conductivity and electrochemical utilization of the electrodes is maintained and the passivity of the electrodes is inhibited.

More particularly, the reduced shape change of each electrode 3 is attributable to the low concentration of electrolyte constituent 6 in-the electrolyte 5. This prevents the dissolution and enhances the thermodynamic stability of the strontium or barium zincate compound produced in each negative electrode during battery discharging. Moreover, since the conductive matrix of each negative electrode is in intimate contact with the active material of the electrode, the conductivity and electrochemical utilization of the electrode is enhanced and passivation of the electrode is prevented, even though the concentration of electrolyte constituent is low.

Accordingly, the battery 1 with the electrodes 3 provides improved cycle life, without significant degradation in performance. Specifically, batteries constructed in this manner and including 25% $Sr(OH)_2$ or $Ba(OH)_2$ have been cycled over 200 times, with no capacity loss and virtually no shape change.

In further accordance with the invention, the zinc electrodes 3 of the battery 1 are also constructed such that the battery exhibits improved gas recombination properties. In particular, the battery 1 exhibits a low pressure rise at the end of charge and rapid pressure decline during discharge. The battery 1 can thus be sealed without the need of substantial venting, thereby avoiding electrolyte loss and drying out of the electrodes.

More particularly, each zinc electrode 3 is configured as a split electrode so as to provide easier access to the electrodes 3 for the oxygen evolved at the positive electrodes 2 during charge. This enhances oxygen recombination with the formation of strontium or barium zincate at the zinc electrodes. Specifically, each zinc electrode 3 comprises like electrode assemblies 3A and 3B separated by a porous hydrophobic element 3C. The like electrode assemblies 3A and 3B and the element 3C are shown in more detail in FIG. 2.

As it can be seen, each assembly 3A and 3B comprises an active element 21 which includes a part (e.g., one-half by weight) of the zinc active material (ZnO in the illustrative case), the $Sr(OH)_2$ or $Ba(OH)_2$ material and the metallic oxide material (shown as PbO in the illustrative case) of electrode. The active element 21 abuts a current collector element 22 comprised of a foil (shown as a copper foil in the illustrative case) plated with a metal ( shown as Ag in the illustrative case). The current collector element 22 is followed by a further gas recombination catalytic element 23 comprised of a material (shown as CdO in the illustrative case) more electrode positive than zinc and having a chemical or electrochemical affinity for reacting with oxygen.

The gas recombination catalytic element 23 of each electrode assembly 3A and 3B abuts the porous hydrophobic element 3C. A separator 3D of the electrode 3 envelops the electrode assemblies 3A and 3B and hydrophobic element 3C to complete each electrode 3.

With this construction of each of the electrodes 3 of battery 1, the gas recombination catalytic elements 23 of each electrode act as catalysts to enhance the oxygen recombination occurring at the electrode. Oxygen evolved at the positive electrodes 2 will now initially react at the elements 23 of the electrodes 3, thereby keeping the gas pressure of the battery low. Additionally, rapid diffusion of oxygen through the split electrode assemblies is promoted by the porous hydrophobic layers 3C, which also keep the interior of the electrode assemblies from filling up with electrolyte.

The zinc negative electrodes 3 and sealed zinc secondary battery 1 thus provide a battery which exhibits very little shape change in its negative electrodes, thereby enhancing the cycle life of the battery. Additionally, the battery exhibits enhanced gas recombination and is, thus, able to be sealed without venting to prevent electrolyte loss, thereby avoiding the need for maintenance. An overall improved sealed zinc secondary battery is thus realized.

EXAMPLE 1

A sealed rechargeable nickel-zinc battery with a rated capacity of 15 ampere-hours was constructed with zinc negative electrodes 3 and electrolyte 5 in accordance with the invention. Each zinc electrode 3 was formed from two like electrode assemblies. Each electrode assembly comprised a zinc active element formed of 64.5 percent ZnO, 25 percent $Sr(OH)_2$, 8 percent PbO and 2.5 percent PTFE. The zinc active element was fabricated by a plastic roll-bonding process as described in U.S. Pat. No. 4,976,904, assigned to the same assignee hereof. The total weight of each zinc active element mass was about 7.85 g.

Each zinc active element was laminated to one face of a current collector element formed from a silver plated perforated copper foil which was 0.003" thick. A gas recombination catalytic element was then laminated to the opposite face of the current collector element to complete each electrode assembly. The gas recombination element comprised a sheet of plastic bonded CdO containing 5 percent PTFE and was approximately 0.005" thick.

A porous PTFE sheet (~65 percent porosity manufactured by Norton) which was 0.005" thick was then sandwiched between two zinc electrode assemblies and the assemblies were placed in two layers of nonwoven polyamide absorber Pellon FS2519 (manufactured by Freudenberg). The resultant electrode 3 was about 0.065" thick. Seven such zinc negative electrodes were constructed.

Each positive electrode of the battery comprised 66 percent $Ni(OH)_2$, 30 percent graphite and 4 percent PTFE. The graphite component was coated with 5 percent $Co_3O_4$ (cobalt oxide spinel) as described in U.S. Pat. No. 4,546,058, also assigned to the same assignee hereof. An electrode sheet was fabricated by the same plastic roll-bonding process of the '904 patent which was used for the zinc active elements of the negative electrodes. The resultant positive electrode had a mass which weighed about 14.16 g. Six positive electrodes were constructed.

The six positive electrodes were each wrapped in three layers of Celgard 3400 microporous polypropylene separator 0.001" thick (manufactured by Hoerscht Chemical) and then assembled in a container in interleaved fashion with the seven negative electrodes. The container was then filled with 20 percent KOH electrolyte containing 1 percent LiOH and subjected to three formation charge-discharge cycles. The container was then sealed and a pressure gauge was installed to monitor gas pressure changes with cycling.

The battery was then placed on a cyclic charge-discharge regimen consisting of charge at 3.83 amperes for 3.6 hours and discharge at 5 amperes for 2.4 hours (depth of discharge 80 percent of rated capacity). The battery was given a deep discharge at 5 amperes to 1.20 volts every 25 cycles to determine its capacity retention; the results are shown in FIG. 3.

Figure 3:
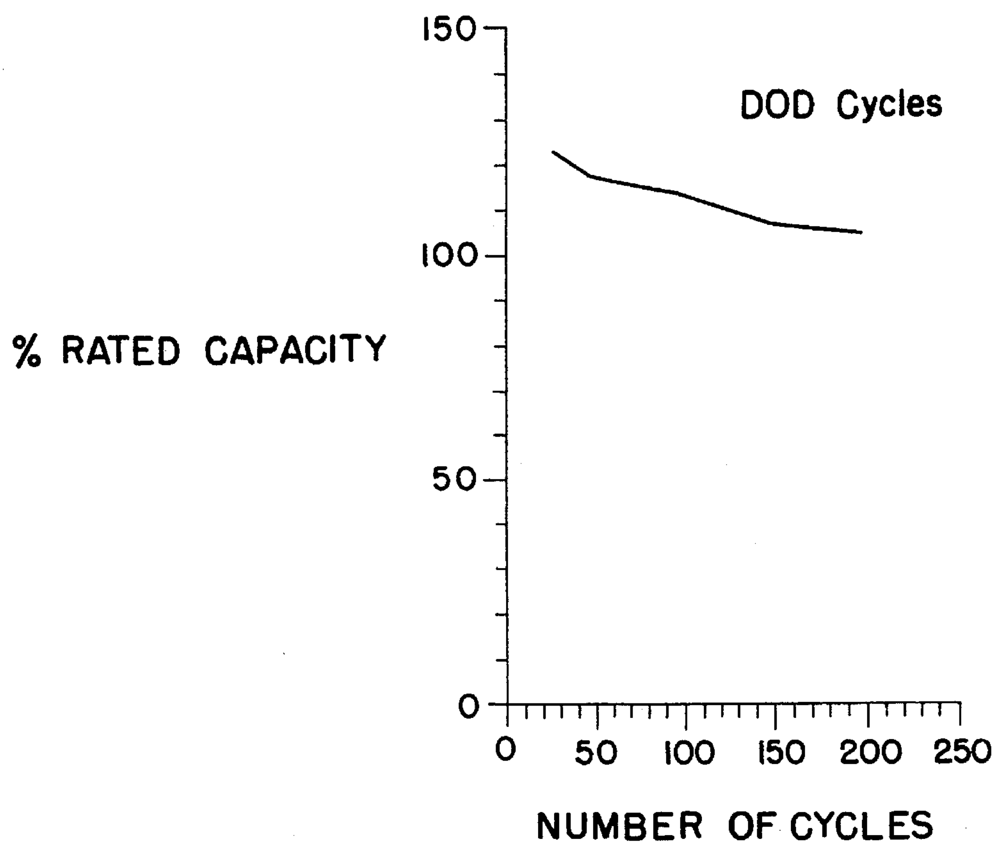
FIG. 3 is a graph which plots capacity versus cycles for a zinc secondary battery constructed in accordance with the principles of the present invention.

As can be seen from FIG. 3, during cycling the capacity of the battery remained over 100 percent of rated for over 200 cycles. This compares quite favorably to a conventionally constructed zinc secondary battery which typically exhibits loss of more than 40 percent of its original capacity after less than 200 cycles.

Observation of the pressure variation with cycling of the constructed battery indicated a maximum pressure of about 20 psig after charge and a pressure of less than 5 psig after discharge, owing to a rapid oxygen recombination during discharge. This again compares favorably with the conventional zinc secondary battery which exhibits a pressure rise to 30 psig at the end of charge and only falls to about 15 psig after discharge.

No evidence of zinc shape change was seen at the edges of the zinc negative electrode in the constructed battery. Again, this was favorable as compared to the conventional battery in which considerable deposits of irregular and spongy zinc masses are accumulated at the edges of the zinc negative electrodes.

The above example demonstrates that, in the battery of the invention, the solubility of the zinc active material in the zinc electrodes is decreased leading to improved cycle life. It also demonstrates that the split electrode assemblies of the battery of the invention provide additional access to gases generated in the battery, thereby resulting in improved gas recombination.

EXAMPLE 2

A similar battery was constructed as in Example 1 with the only change being that the $Sr(OH)_2$ in the zinc negative electrode was replaced by $Ba(OH)_2$.

In all cases it is understood that the above-described arrangements are merely illustrative of the many possible specific embodiments which represent applications of the present invention. Numerous and varied other arrangements, can be readily devised in accordance with the principles of the present invention without departing from the spirit and scope of the invention. Thus, for example, the positive electrodes 2 of the battery 1 could have also contained a $MnO_2$ active material, instead of a $Ni(OH)_2$ active material.

What is claimed is:

1. Apparatus comprising:

at least one zinc negative electrode, said zinc negative electrode including: a zinc active material; one of a $Ba(OH)_2$ and $Sr(OH)_2$ material present in an amount in the range of 15–40 percent of the weight of said zinc negative electrode; and a conductive matrix including a metallic oxide material which is more electropositive than zinc, which is one of PbO, $Bi_2O_3$, CdO, $Ga_2O_3$ add $Tl_2O_3$, and which is present in an amount in the range of 5–20 percent of the weight of said zinc negative electrode;

said zinc negative electrode further including a porous hydrophobic element and being formed by first and second electrode assemblies with said porous hydrophobic element disposed therebetween, each of said first and second electrode assemblies comprising: an active element containing a part of said zinc active material, said one of said $Ba(OH)_2$ and $Sr(OH)_2$ material and metallic oxide material; a current collector element having a first face abutting said active element; and a gas recombination catalytic element containing a metallic oxide which is more electro-positive than zinc and has a chemical or electrochemical affinity for oxygen, said gas recombination catalytic element abutting a second face of said current collector element and abutting said porous hydrophobic element;

an electrolyte containing an electrolyte constituent which is 5–20 percent of the weight of said electrolyte;

at least one positive electrode; and a container in which is disposed each said zinc negative electrode, each said positive electrode and said electrolyte.

2. Apparatus in accordance with claim 1 wherein:

said one zinc negative electrode further comprises a separator element enveloping said first and second electrode assemblies and said porous hydrophobic element.

3. Apparatus in accordance with claim 2 wherein:

said current collector element comprises a copper foil plated with silver;

said metallic oxide of said gas recombination catalytic element comprises CdO; and said active element and said gas recombination catalytic element each further comprise PTFE.

4. Apparatus in accordance with claim 1 wherein:

said porous hydrophobic element comprises PTFE.

5. Apparatus in accordance with claim 1 wherein:

said container is sealed.

6. Apparatus in accordance with claim 1 wherein:

said one positive electrode comprises one of $Ni(OH)_2$ material and $MnO_2$ material.

7. Apparatus in accordance with claim 1 wherein:

said positive and negative electrodes are disposed in an interleaved manner in said container.

8. Apparatus in accordance with claim 1 wherein:

each of said electrode assemblies contains one-half of said zinc active material, said one of said $Ba(OH)_2$ and $Sr(OH)_2$ material and metallic oxide material in weight percent of said zinc negative electrode.

9. Apparatus comprising:

at least one zinc negative electrode, said zinc negative electrode including: a zinc-active material; one of a $Ba(OH)_2$ and $Sr(OH)_2$ material; and a conductive matrix including a metallic oxide which is more electropositive than zinc;

said zinc negative electrode further including a porous hydrophobic element and being formed by first and second electrode assemblies with said porous hydrophobic element disposed therebetween, each of said first and second electrode assemblies comprising: an active element containing a part of said zinc active material, said one of said $Ba(OH)_2$ and $Sr(OH)_2$ material and metallic oxide material; a current collector element having a first face abutting said active element; and a gas recombination catalytic element containing a metallic oxide which is more electro-positive than zinc and has a chemical or electrochemical affinity for oxygen, said gas recombination catalytic element abutting a second face of said current collector element and abutting said porous hydrophobic element;

an electrolyte;

at least one positive electrode;

and a container in which is disposed each said zinc negative electrode, each said positive electrode and said electrolyte.

10. Apparatus in accordance with claim 9 wherein:

said electrolyte contains an electrolyte constituent which is 5–20 percent of the weight of said electrolyte.

11. Apparatus in accordance with claim 10 wherein:

said electrolyte is KOH.

12. Apparatus in accordance with claim 9 wherein:

said container is sealed.

13. Apparatus in accordance with claim 9 wherein:

said one zinc negative electrode further comprises a separator element enveloping said first and second electrode assemblies and said porous hydrophobic element.

14. Apparatus in accordance with claim 13 wherein:

said current collector element comprises a copper foil plated with silver;

said metallic oxide of said gas recombination element comprises CdO; and said active element and said gas recombination catalytic element each further comprise PTFE.

15. Apparatus comprising:

at least one zinc negative electrode, said zinc negative electrode including: a zinc-active material; one of a $Ba(OH)_2$ and $Sr(OH)_2$ material; and a conductive matrix including a metallic oxide which is more electropositive than zinc;

said zinc negative electrode further including a porous hydrophobic element and being formed by first and second electrode assemblies with said porous hydrophobic element disposed therebetween, each of said first and second electrode assemblies comprising: an active element containing a part of said zinc active material; said one of said $Ba(OH)_2$ and $Sr(OH)_2$ material and metallic oxide material; a current collector element having a first face abutting said active element; and a gas recombination catalytic element containing a metallic oxide which is more electro-positive than zinc and has a chemical or electrochemical affinity for oxygen, said gas recombination catalytic element abutting a second face of said current collector element and abutting said porous hydrophobic element;

and at least one positive electrode.

16. Apparatus comprising:

at least one zinc negative electrode, said zinc negative electrode including: a zinc-active material; one of a $Ba(OH)_2$ and $Sr(OH)_2$ material; and a conductive matrix including a metallic oxide which is more electropositive than zinc;

said zinc negative electrode further including a porous hydrophobic element and being formed by first and second electrode assemblies with said porous hydrophobic element disposed therebetween, each of said first and second electrode assemblies comprising: an active element containing a part of said zinc active material, one of said $Ba(OH)_2$ and $Sr(OH)_2$ material and metallic oxide material; a current collector element having a first face abutting said active element; and a gas recombination catalytic element containing a metallic oxide which is more electro-positive than zinc and has a chemical or electrochemical affinity for oxygen, said gas recombination catalytic element abutting a second face of said current collector element and abutting said porous hydrophobic element;

at least one positive electrode; and a container in which is disposed each said zinc negative electrode and each said positive electrode.

17. Apparatus in accordance with claim 16 wherein:

said container is sealed.

18. Apparatus in accordance with claim 16 wherein:

each zinc negative electrode further comprises a separator element enveloping said first and second electrode assemblies and said porous hydrophobic element.

19. Apparatus in accordance with claim 18 wherein:

said current collector element comprises a copper foil plated with silver;

said metallic oxide of said gas recombination catalytic element comprises CdO; and said active element and said gas recombination catalytic element each further comprise PTFE.

20. Apparatus comprising:

at least one zinc negative electrode, said zinc negative electrode including: a zinc-active material; one of a $Ba(OH)_2$ and $Sr(OH)_2$ material; and a conductive matrix including a metallic oxide which is more electropositive than zinc;

said zinc negative electrode further including a porous hydrophobic element and being formed by first and second electrode assemblies with said porous hydrophobic element disposed therebetween, each said first and second electrode assemblies comprising: an active element containing a part of said zinc active material, said one of said $Ba(OH)_2$ and $Sr(OH)_2$ material and metallic oxide material; a current collector element having a first face abutting said active element; and a gas recombination catalytic element containing a metallic oxide which is more electro-positive than zinc and has a chemical or electrochemical affinity for oxygen, said gas recombination catalytic element abutting a second face of said current collector element and said porous hydrophobic element.

21. Apparatus in accordance with claim 20 wherein:

said metallic oxide layer has a chemical or electrochemical affinity for reacting with oxygen.

22. Apparatus in accordance with claim 20 wherein:

said positive electrode comprises one of $Ni(OH)_2$ material and $MnO_2$ material.

23. Apparatus in accordance with claim 20 wherein:

said one zinc negative electrode further comprises a separator element enveloping said first and second electrode assemblies and said porous hydrophobic element.

24. Apparatus in accordance with claim 23 wherein:

said current collector element comprises a copper foil plated with silver;

said metallic oxide of said gas recombination catalytic element comprises CdO; and said active element and said gas recombination catalytic element each further comprise PTFE.

25. Apparatus in accordance with claim 20 wherein:

each of said electrode assemblies contains one-half of said zinc active material, said one of said $Ba(OH)_2$ and $Sr(OH)_2$ material and metallic oxide material in weight percent of said zinc negative electrode.

26. Apparatus in accordance with claim 20 wherein:

said metallic oxide material of said active element of each electrode assembly is one of PbO, $Bi_2$, $O_3$, CdO, $Ga_2O_3$ and $Tl_2O_3$.

27. Apparatus in accordance with claim 20 wherein:

said one of said $Ba(OH)_2$ and $Sr(OH)_2$ material is in the range of 15–40 percent of the weight of said zinc negative electrode;

and said metallic oxide material of said active elements of said electrode assemblies is in the range of 5–20 percent of the weight of said zinc negative electrode.

28. Apparatus in accordance with claim 27 wherein:

said metallic oxide material of said active element of each electrode assembly is one of PbO, $Bi_2O_3$, CdO, $Ga_2O_3$ and $Ti_2O_3$.

* * * * *

UNITED STATES PATENT AND TRADEMARK OFFICE

CERTIFICATE OF CORRECTION

PATENT NO. : 5,556,720

DATED : September 17, 1996

INVENTOR(S) : Allen Charkey

It is certified that error appears in the above-indentified patent and that said Letters Patent is hereby corrected as shown below:

Col. 3, line 14, change "$Ti_2O_3$" to -- $Tl_2O_3$ --.

Col. 6, line 16, change "add" to -- and --.

Col. 10, line 5, change "$Bi_2,O_3$" to -- $Bi_2O_3$ --.

Col. 10, line 17, change "$Ti_2O_3$" to -- $Tl_2O_3$ --.

Signed and Sealed this

Tenth Day of June, 1997

Attest:

BRUCE LEHMAN

*Attesting Officer* *Commissioner of Patents and Trademarks*